United States Patent [19]

McKay

[11] Patent Number: 4,606,369

[45] Date of Patent: Aug. 19, 1986

[54] MANUALLY-OPERABLE FLUID PRESSURE REGULATING VALVE DEVICE

[75] Inventor: Albert A. McKay, Stoney Creek, Canada

[73] Assignee: WABCO Ltd., Hamilton, Canada

[21] Appl. No.: 750,798

[22] Filed: Jul. 1, 1985

[51] Int. Cl.[4] ............................................. G05D 16/08
[52] U.S. Cl. ................................ 137/116.5; 137/627.5; 251/238
[58] Field of Search ............. 91/434; 137/116.5, 627.5

[56] References Cited

U.S. PATENT DOCUMENTS

| | | | |
|---|---|---|---|
| 1,314,195 | 8/1919 | Jarvis | 251/239 X |
| 3,026,908 | 3/1962 | Blair | 137/627.5 |
| 3,071,147 | 1/1963 | Dudzinski | 137/627.5 |
| 3,146,916 | 9/1964 | Kronheim | 137/627.5 X |
| 4,134,418 | 1/1979 | Woodcock | 137/627.5 X |

Primary Examiner—Robert G. Nilson
Attorney, Agent, or Firm—G. J. Falce

[57] ABSTRACT

A manually-operable pressure-regulating valve device, including a special handle mechanism and a self-lapping valve assembly having a feedback piston on which delivery pressure acts to urge the valve assembly actuating stem in a direction opposite handle pressure, thereby transmitting to the operator a "feel" of the effective delivery pressure. The handle mechanism includes an elongated lever for operating the self-lapping unit with mechanical advantage to reduce operator fatigue. The elongated lever is made flexible, so that movement of the self-lapping valve assembly toward lap position, following actuation thereof, is absorbed by flexure of the elongated lever in order to, in effect, isolate the handle from the self-lapping unit in terms of movement without losing handle "feel" of the delivery pressure acting on the self-lapping valve assembly.

9 Claims, 1 Drawing Figure

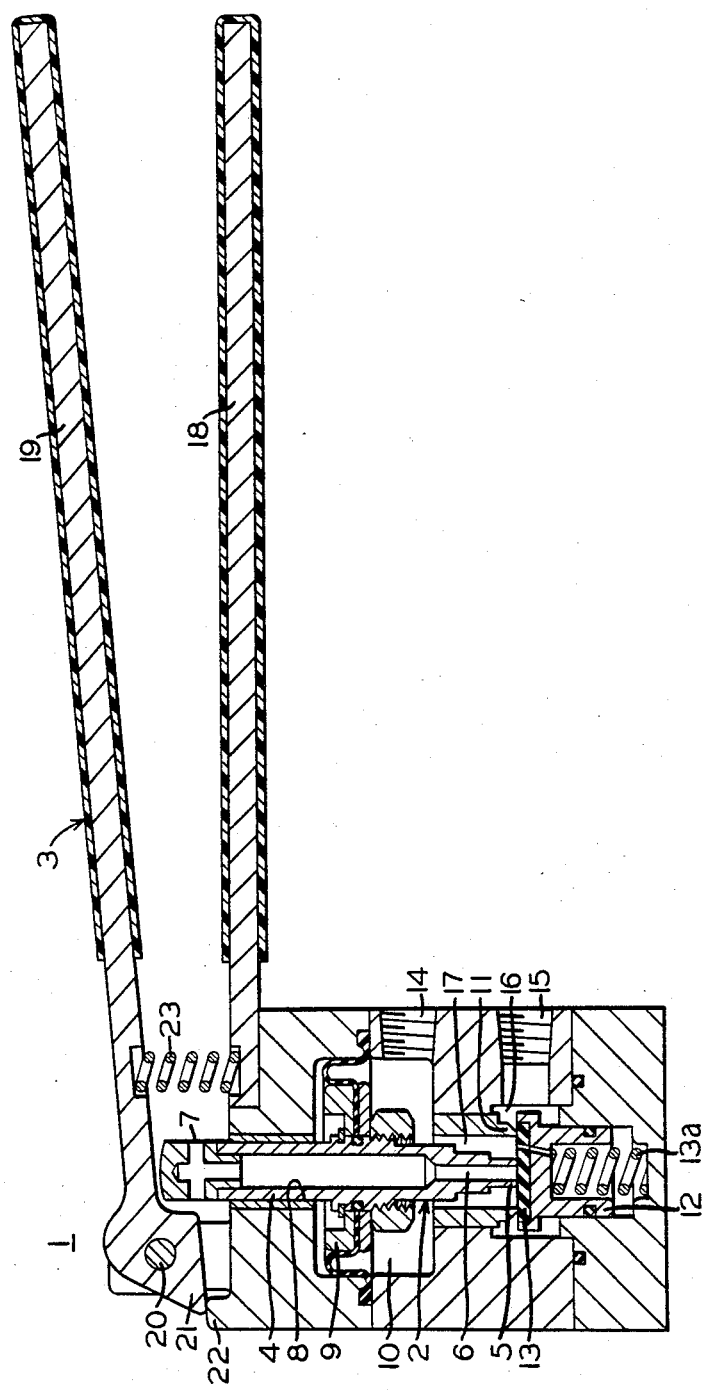

MANUALLY-OPERABLE FLUID PRESSURE REGULATING VALVE DEVICE

BACKGROUND OF THE INVENTION

The present invention relates to a pressure-regulating-type control valve, and particularly to hand-operated pressure-regulating control valves requiring precise and extremely responsive control characteristics.

Typically, pressure-regulating-type control valves employ a control spring, against which a dual-valve assembly is positioned by movement of an operator's handle. In positioning the valve assembly, different degrees of spring compression are obtained. Feedback of the delivery pressure obtained in the open position of the valve assembly is balanced against the spring compression force to lap off the supply of delivery pressure at a value corresponding to the force of compression of the control spring. In counteracting the spring force, however, the delivery pressure is isolated from the portion of the valve assembly to which the operator's handle is connected. Such an arrangement, therefore, leaves the operator insensitive to the effective delivery pressure. That is, the operator has no "feel" of the actual delivery pressure, and thus, has no knowledge of a loss of delivery pressure due, for examaple, to a break in the pressure line or other system failure.

SUMMARY OF THE INVENTION

It is, therefore, an object of the present invention to provide a hand-operated pressure-regulating valve arranged to transmit the feedback force of the effective delivery pressure directly to the operator's handle.

It is another object of the invention to reduce the handle-operating forces required to counteract the feedback force transmitted to the handle, thereby reducing operator fatigue.

Still another object of the invention is to optimize handle-control to assure precise regulation.

Briefly, the invention comprises a self-lapping-type valve assembly having a single valve sealing element, arranged for engagement with concentrically-placed exhaust and supply valve seats, the latter being connected to a movable actuating stem to which a feedback piston is connected. An extension of the actuating stem is engageable with an operator's handle, which effects displacement of the actuating stem in a direction opposite to the force exerted thereon by the feedback piston in response to delivery pressure acting thereon. Downward displacement of the actuating stem causes the exhaust valve seat to engage the valve seal element to close off an atmospheric passage in the actuating stem and, concurrently, unseat the seal element from the supply valve seat to establish communication between a source of pneumatic pressure and a delivery line. As the delivery pressure develops, it acts under the feedback piston to urge the actuating stem in an upward direction. When the downward-operating force of the handle is offset by the force of the feedback piston, the valve seal element reengages the supply valve seat to terminate further supply of pressure to the delivery line at a value corresponding to the operator force maintained at the handle. In this so-called lap position, the valve element remains in engagement with both the supply and exhaust valve seats.

In order to reduce operator fatigue, the handle is made relatively long to obtain mechanical advantage. If the operator reduces the handle force, an upward-acting force imbalance occurs on the actuating stem to unseat the exhaust valve seat from the valve element, and thereby vent the delivery pressure via the atmospheric passage in the actuating stem until a force balance is again reached, at which point the valve assembly is restored to its lap position.

In accordance with the present invention, the relatively long operator's handle comprises a pair of spaced-apart elongated arms arranged to be squeezed together, with the one arm being engageable with the actuating stem of the self-lapping valve assembly to effect the displacement thereof. The elongated arms not only provide mechanical advantage, but are flexible in order to reduce the actual handle movement where manual force is applied, as the self-lapping valve assembly is restored to lap position through the action of the feedback piston. This allows the relative space between the handle arms to vary with different handle forces to obtain a point of reference, and thereby facilitate the operator's ability to maintain the handle-operating force constant.

These and other objects and attendant advantages of the invention will appear in the following more detailed explanation when taken in conjunction with the single FIGURE drawing, showing a sectional assembly view of a manually-operable pressure-regulating valve according to the present invention.

DESCRIPTION AND OPERATION

Referring now to the drawing, pressure-regulating valve device 1 comprises a self-lapping valve assembly 2 and an operator's handle mechanism 3. Self-lapping valve assembly 2 includes an actuating stem 4 having an annular exhaust valve seat 5, formed at one end in surrounding relationship with the opening of a central passage 6 in actuating stem 4. Central passage 6 opens to atmosphere at the opposite end 7 of stem 4, which end projects beyond the body of pressure-regulating valve device 1. A bushed bore 8 guidably receives stem 4 so as to be reciprocal therein. Attached to stem 4, at a location between bore 8 and exhaust valve seat 5, so as to be reciprocal with the stem 4, is a diaphragm-type feedback piston 9. A pressure chamber 10 is formed in the valve body between the underside of feedback piston 9 and an annular supply valve seat 11 that is press-fit into the valve body so as to coaxially surround exhaust valve seat 5. A valve member 12 contains a valve sealing element 13 that is engageable with valve seats 5 and 11 under the loading of a bias spring 13a. A delivery port 14 is communicated with pressure chamber 10 directly. A supply port 15 is communicated with a pressure chamber 16 formed about the periphery of supply valve seat 11 and valve member 12. Fluid pressure communication is established between chambers 10 and 16 via an annular passage 17 between valve seats 5 and 11, when valve sealing element 13 is disengaged from supply valve seat 11. Fluid pressure communication is established between pressure chamber 10 and atmosphere via annular passage 17 and central passage 6 in stem 4, when valve sealing element 13 is disengaged from exhaust valve seat 5. Engagement of valve sealing element 13 with the respective valve seats 5 and 11 interrupts the aforementioned fluid pressure communications.

Comprising the operator's handle mechanism 3, is an elongated flexible arm 18 fixed at one end to the valve body, and another elongated flexible arm 19 pivotally-connected by a pin 20 to the valve body in spaced-apart relationship with arm 18, so as to engage the projecting end of actuating stem 4 at a point near pivot pin 20 to provide a high lever ratio of arm 19. The pivotal end of arm 19 is formed with a lug 21 that is adapted to engage a stop portion 22 formed on the valve body. A return spring 23 is carried between arms 18 and 19, at the point of connection of arm 18 with the valve body, to urge arm 19 away from arm 18 until lug 21 engages stop portion 22 to establish the normal spaced-apart relationship between arms 18 and 19. In this normal handle position, bias spring 13a, acting through valve member 12, is effective to force actuating stem 4 upwardly until valve sealing element 13 engages supply valve seat 11. In this uppermost position of actuating stem 4, arm 19 is normally held out of engagement with the projecting end of stem 4 by spring 23. Arms 18 and 19 may be encapsulated with a covering of rubber, teflon, or other like material over their working length to provide a suitable hand grip.

In operation, delivery pressure at port 14 is regulated by the degree of force imposed on actuating stem 4 via handle mechanism 3. When it is desired to increase the delivery pressure, the operator exerts an actuating force on the handle mechanism to depress actuating stem 4, preferably by squeezing the elongated arms 18 and 19 together against return spring 23. As arm 19 pivots about pin 20, it engages the projecting end 7 of stem 4, which is shifted downwardly. The opposite end of stem 4, having exhaust valve seat 5, initially engages valve sealing element 13, thereby closing off central passage 6 from passage 17. Further downward movement of stem 4 pushes valve sealing element 13 off of supply valve seat 11, thereby connecting supply pressure from port 15 to delivery port 14 via pressure chamber 16, the open supply valve, annular passage 17, and pressure chamber 10. As the delivery pressure builds up, the pressure effective in pressure chamber 10 acts on piston 9 to exert an upward-acting force on stem 4, opposing the downward-acting force exerted via handle mechanism 3. Consequnetly, stem 4 is gradually shifted upwardly until valve sealing element 13 is reengaged with supply valve seat 11 by bias spring 13a when a force balance exists between the actuating force on stem 4, the force of delivery pressure acting on piston 9, and the light force of bias spring 13a. It will be understood, of course, that throughout the aforementioned movement of stem 4, valve sealing element 13 remains in engagement with exhaust valve seat 5 under the influence of bias spring 13a. In this so-called lap position, in which the supply and exhaust valves are both closed, further supply of pressure to chamber 10 and delivery port 14 is terminated, and the delivery pressure thus developed is held constant at a value corresponding to the handle actuating force exerted by the operator.

A further increase or decrease in delivery pressure can be achieved by the operator through an increase or decrease in handle pressure, as desired. For example, if a decrease in delivery pressure is deisred, the operator's hand pressure on handle mechanism 3 is reduced, thereby reducing the downward-acting force on actuating stem 4. This upsets the force balance on valve assembly 2, whereby delivery pressure in chamber 10 acts on feedback piston 9 to force actuating stem 4 in an upward direction. Exhaust valve seat 5 is thus unseated from valve element 13, which remains in engagement with supply valve seat 11 under the influence of bias spring 13a. Supply port 15 thus remains disconnected from delivery port 14 by closure of the supply valve; while, concurrently, delivery port 14 is connected to atmosphere via chamber 10, annular passage 17, the open exhaust valve, and central passage 6 in stem 4. As the delivery pressure thus exhausts, the corresponding reduction of pressure in chamber 10, acting on feedback piston 9, reestablishes a force balance on valve assembly 2, at which point, exhaust valve seat 5 reengages valve element 13 to terminate any further exhaust of delivery pressure.

On the other hand, if a pressure increase is desired, the operator applies increased handle force. This upsets the force balance on valve assembly 2, whereby actuating stem 4 is moved in a downward direction to unseat valve element 13 from supply valve seat 11 by engagement of exhaust valve seat 5 with the valve element. Thus, delivery pressure is cut off from exhaust while, concurrently, fluid pressure is supplied to delivery port 14 via the open supply valve until the effective force of the delivery pressure in chamber 10, acting on feedback piston 9, is sufficient to restore a force balance on valve assembly 2 to bring the valve assembly to lap position. In lap position, further build-up of delivery pressure is terminated at a value corresponding to the handle force exerted by the operator.

In that actuating stem 4, to which feedback piston 9 is attached, engages handle arm 19 directly, it will be appreciated that the operator, through his operating engagement with elongated arms 18 and 19, is provided with a "feel" of the delivery pressure as it is being developed; and is also provided with a "feel" of the opening and closing of valve element 13 with supply valve seat 11, as occurs in effecting a change in delivery pressure in accordance with the aforegoing discussion. Accordingly, the operator is able to sense a malfunction, such as, a break in the line carrying delivery pressure from port 14 to the device being operated.

Moreover, elongated arms 18 and 19, by reason of being flexible, provide additional improved operating characteristics. For example, if arms 18 and 19 were rigid, a minimum amount of movement of actuating stem 4, transmitted directly to arm 19, would result in a considerable amount of relative arm movement at the extremities of the handle arms due to the high lever ratio of arm 19. This would make it difficult for the operator to maintain a constant and precise handle force. Being in direct engagement with actuating stem 4, handle arm 19 would necessarily follow movement of stem 4, so as to have a relatively large span of motion of the arm extremity.

By making the handle arms flexible, instead of rigid, however, this movement of the actuating stem 4 is absorbed predominately in the flexure of arm 19, with motion of the handle arms being virturally eliminated, so that very little motion is transmitted to the point of hand engagement with arms 18 and 19. In thus reducing this motion of the handle arms, it will be appreciated that a more precise and constant control force according to the force of flexure of the handle arms can be exerted by the operator through handle mechanism 3, since the handle position for a given pressure remains substantially constant while still providing a "feel" of the delivery pressure.

Not only does this flexure of the handle arms provide the advantage above-discussed, but also makes it possible for the operator to judge the degree of pressure being delivered by providing a frame of reference by which a measure of the effective handle force can be ascertained as an indication of the delivery pressure. This frame of reference, of course, is the relative distance between the arms 18 and 19, which distance decreases as the amount of delivery pressure desired (handle force) increases. This obviously elininates the need for a pressure gauge which the operator, in many industrial-type operations, has no time to view, since his full attention must be directed continuously on the operation being performed.

The fact that arms 18 and 19 are elongated with respect to the lever arm distance from actuating stem 4 to the end of arms 18 and 19, as compared to the lever arm distance from actuating stem 4 to pivot pin 20, a rather large mechanical advantage is provided for the purpose of reducing operator fatigue. As mentioned in the foregoing discussion, such mechanical advantage normally would translate into an inordinate span of motion at the arm ends, but due to the flexure of arms 18 and 19, this motion is virtually eliminated without adversely affecting the operation of self-lapping valve assembly 2.

It should also be apparent that the operator may actuate the handle mechanism anywhere along its active length and, in this way, alter the effective mechanical advantage. For example, if the desired delivery pressure is low, only light handle forces are required, and therefore the operator can operate the handle at a point closer to the actuating stem 4, where the mechanical advantage is less than when operating the handle nearer to the ends of arms 18 and 19.

Having now desribed the invention, what I claim as new and desire to secure by Letters Patent, is:

1. A manually-operable regulating valve device for controlling a delivery fluid under pressure comprising:
   (a) a valve body;
   (b) a self-lapping valve assembly including:
      (i) valve means in said valve body for controlling the supply and exhaust of the delivery fluid pressure;
      (ii) an actuating stem reciprocally movable in said valve body and having one end projecting therefrom and the other end engageable with said valve means, whereby movement of said actuating stem in one direction effects the supply of delivery pressure, and movement of said actuating stem in the other direction effects the exhaust of delivery pressure; and
      (iii) a feedback piston connected to said actuating stem, said feedback piston being subject on one side thereof to the delivery fluid pressure to urge movement of said actuating stem in said other direction; and
   (c) a handle mechanism comprising:
      (i) a flexible lever having one end pivotally-connected to said body and the other end free, said lever being directly engageable with said projecting end of said actuating stem at a point intermediate said pivot end and said other end to effect said movement of said actuating stem in said one direction according to the force of flexure of said lever.

2. A manually-operable regulating valve device, as recited in claim 1, further characterized in that said lever is elongated and is engageable with said actuating stem at a point nearer said one end than the other end to provide mechanical advantage for operating said handle mechanism.

3. A manually-operable regulating valve device, as recited in claim 2, further comprising:
   (a) an elongated arm member having one end fixed to said valve member in spaced-apart relationship with said lever;
   (b) a return spring between said lever and said arm member at the point of connection of said arm member with said valve body to urge said lever in a direction corresponding to movement of said actuating stem in said other direction; and
   (c) a lug formed on said lever at said pivot end thereof engageable with said valve body to provide a stop to limit said movement of said lever by said return spring.

4. A manually-operable regulating valve device, as recited in claim 1, wherein said handle mechanism further comprises an arm member having one end fixed to said valve member in spaced-apart relationship with said lever, whereby said actuating stem is moved in said one direction by squeezing of said lever and said arm member together.

5. A manually-operable regulating valve device, as recited in claim 4, further characterized in that said lever is engageable with said actuating stem at a point nearer said one end than the other end to provide mechanical advantage for operating said handle mechanism.

6. A manually-operable regulating valve device, as recited in claim 5, wherein said handle mechanism further comprises a return spring between said lever and said arm member to urge said lever away from said arm member to provide said spaced-apart relationship therebetween.

7. A manually-operable regulating valve device, as recited in claim 6, further characterized in that the ends of said lever and said arm member, opposite said pivot end and said fixed ends thereof, are substantially the same in length beyond said valve body.

8. A manually-operable regulating valve device, as recited in claim 4, wherein said lever and said arm member are elongated, and said actuating stem is moved in said one direction by squeezing of said elongated lever and arm member together.

9. A manually-operable regulating valve device, as recited in claim 8, further characterized in that said arm member is flexible.

* * * * *